(12) United States Patent
Buzza et al.

(10) Patent No.: US 12,495,751 B2
(45) Date of Patent: Dec. 16, 2025

(54) BRASSICA JUNCEA LINE NUBJ1207

(71) Applicant: Nuseed Nutritional Australia Pty Ltd., Victoria (AU)

(72) Inventors: Greg Buzza, Horsham (AU); Srinivas Belide, Canberra (AU); Malcolm Devine, Calgary (AU); Wenxiang Gao, Rocklin, CA (US); Nelson Gororo, Horsham (AU); Antonio Leonforte, Horsham (AU); Jason McAllister, Victoria (AU); James Petrie, Goulburn (AU); Pushkar Shrestha, Acton (AU); Surinder Singh, Downer (AU); Xue-Rong Zhou, Harrison (AU)

(73) Assignee: Nuseed Nutritional Australia Pty Ltd., Laverton North (AU)

( * ) Notice: Subject to any disclaimer, the term of this patent is extended or adjusted under 35 U.S.C. 154(b) by 563 days.

(21) Appl. No.: 17/638,647

(22) PCT Filed: Aug. 26, 2020

(86) PCT No.: PCT/US2020/048038
§ 371 (c)(1),
(2) Date: Feb. 25, 2022

(87) PCT Pub. No.: WO2021/041570
PCT Pub. Date: Mar. 4, 2021

(65) Prior Publication Data
US 2022/0346340 A1 Nov. 3, 2022

Related U.S. Application Data

(60) Provisional application No. 62/891,908, filed on Aug. 26, 2019.

(51) Int. Cl.
*A01H 6/20* (2018.01)
*A01H 5/10* (2018.01)

(52) U.S. Cl.
CPC ............... *A01H 6/201* (2018.05); *A01H 5/10* (2013.01)

(58) Field of Classification Search
None
See application file for complete search history.

(56) References Cited

U.S. PATENT DOCUMENTS

| | | | |
|---|---|---|---|
| 9,550,718 B2 * | 1/2017 | Petrie | ............ A61P 9/00 |
| 11,613,761 B1 | 3/2023 | Senger et al. | |
| 2013/0189682 A1 | 7/2013 | Cui et al. | |
| 2013/0338387 A1 | 12/2013 | Petrie et al. | |
| 2015/0166928 A1 | 6/2015 | Petrie et al. | |
| 2017/0335338 A1 | 11/2017 | Andre | |
| 2018/0016590 A1 | 1/2018 | Devine et al. | |
| 2018/0016591 A1 * | 1/2018 | Devine | ............ A61P 9/00 |
| 2023/0293615 A1 | 9/2023 | Senger et al. | |

FOREIGN PATENT DOCUMENTS

| | | |
|---|---|---|
| CN | 102281755 A | 12/2011 |
| CN | 105121651 A | 12/2015 |
| CN | 105219789 A | 1/2016 |
| CN | 109566406 A | 4/2019 |
| CN | 109661458 A | 4/2019 |
| JP | 2017-532949 A | 11/2017 |
| JP | 2017-534293 A | 11/2017 |
| JP | 2018-500885 A | 1/2018 |
| WO | 2014170387 A1 | 10/2014 |

OTHER PUBLICATIONS

"International Search Report and Written Opinion received for PCT Patent Application No. PCT/US20/48038", mailed on Feb. 3, 2021, 18 pages.
"International Preliminary Report on Patentability Received for PCT Patent Application No. PCT/US20/48038", mailed on Mar. 10, 2022, 8 pages.
Extended European Search Report received for European Patent Application No. 20858128.0 mailed on Oct. 2, 2023, 11 pages.
Office Action received for Japanese Patent Application No. 2022-513068 mailed on Oct. 10, 2023, 16 pages (7 pages of official document and 9 pages of English translation).
Wu et al., "Stepwise Engineering to Produce High Yields of Very Long-chain Polyunsaturated Fatty Acids in Plants", Nature Biotechnology, vol. 23, No. 8, Aug. 2005, pp. 1013-1017.
Belide, S., "Engineering docosapentaenoic acid(DPA) and docosahexaenoic acid(DHA) in *Brassica Juncea*", Plant Biotechnology Journal, vol. 20, 2022, pp. 19-21.
Office Action received for Chinese Patent Application No. 2020800748919, mailed on Feb. 24, 2023, 10 pages (Official).

* cited by examiner

*Primary Examiner* — Amjad Abraham
*Assistant Examiner* — Brian James Sullivan
(74) *Attorney, Agent, or Firm* — Wiley Rein LLP

(57) ABSTRACT

The present embodiments provide a novel DPA-producing *Brassica juncea* (DPA *juncea*) line designated as NUBJ1207. The embodiments also provide the seeds, the plants, and the plant parts (including DNA) of DPA *juncea* line NUBJ1207, as well as to methods for producing a *Brassica* plant produced by crossing DPA *juncea* line NUBJ1207 with itself or another *Brassica* line. These embodiments also provide methods for producing a DPA-producing *Brassica* plant containing in its genetic material one or more transgenes, and to the transgenic plants and plant parts produced by those methods. These embodiments further provide DPA production lines or breeding lines and plant parts derived from DPA *juncea* line NUBJ1207, to methods for producing canola lines or plant parts derived from line NUBJ1207, and to the DPA-producing *Brassica* plants, varieties, and their parts derived from use of those methods. These embodiments also provide hybrid seeds, plants, and plant parts produced by crossing the DPA *juncea* line NUBJ1207 with another *Brassica* or canola line.

17 Claims, No Drawings
Specification includes a Sequence Listing.

SEQUENCE LISTING

```
<160> NUMBER OF SEQ ID NOS: 6

<210> SEQ ID NO 1
<211> LENGTH: 200
<212> TYPE: DNA
<213> ORGANISM: Artificial Sequence
<220> FEATURE:
<223> OTHER INFORMATION: DNA sequence of the 5' junction on chromosome
      A08

<400> SEQUENCE: 1
taatcagaga aagcttgatg tccacactcw tgagcgagrr sccagattcc ggttccgaaa      60
agtccttgaa cgtarggtrt aargryyyag aaagtgaact tcaaacactg atagtttaaa    120
ctgaaggcgg gaaacgacaa tctgctagtg gatctcccag tcacgacgtt gtaaaacggg    180
cgccccgcgg aaagcttgcg                                                200

<210> SEQ ID NO 2
<211> LENGTH: 200
<212> TYPE: DNA
<213> ORGANISM: Artificial Sequence
<220> FEATURE:
<223> OTHER INFORMATION: DNA sequence of the 3' junction on chromosome
      A08

<400> SEQUENCE: 2
aagataccca cttttacaac aattaccaac aacaacaaac aacaaacaac attacaatta     60
catttacaat taccatacca tgccacctag cgctgctaag actgatggaa gatcttctcc    120
tagatctcca cttgcagatc taaatcttct gctgaggctc ttgatgcttt aaggatgctt    180
ctactgctct gttgatgctt                                                200

<210> SEQ ID NO 3
<211> LENGTH: 200
<212> TYPE: DNA
```

```
<213> ORGANISM: Artificial Sequence
<220> FEATURE:
<223> OTHER INFORMATION: DNA sequence of the 5' junction on chromosome
      A06

<400> SEQUENCE: 3
tgctcggtgt tactagaaga cctctgttcw taggatcaga tccagtaacg gtaacagcgc    60
tcatggtatg gtaattgtaa atgtaattgt aatgttgttt gtttgtaaaa aaaattaatt   120
tttactaaca catatattta cttatcaaaa atttgacaaa gtaagattaa ataatattc    180 atctaacaaa aaaaaaacca                                                200

<210> SEQ ID NO 4
<211> LENGTH: 200
<212> TYPE: DNA
<213> ORGANISM: Artificial Sequence
<220> FEATURE:
<223> OTHER INFORMATION: DNA sequence of the 3' junction on chromosome
      A06

<400> SEQUENCE: 4
cgcgcggtgt catctatgtt actagatcac tagtgatgta cggttaaaac caccccagta    60
cattaaaaac gtccgcaatg tgttattaag ttgtctaagc ttccaacgac aatymmgtgg   120
atagcaaaac caatgataac aaacrgcagt rrcaacgaac myragaggcc agttgtggga   180
atcaacttct acctcaagtg                                                200

<210> SEQ ID NO 5
<211> LENGTH: 200
<212> TYPE: DNA
<213> ORGANISM: Artificial Sequence
<220> FEATURE:
<223> OTHER INFORMATION: DNA sequence of the 5' junction on chromosome
      B07

<400> SEQUENCE: 5
ttggtcaaca tccaccaaca actattcttt ttggacaatt ttatagaaaa cactcaatat    60
gtgattgata tataatttaa aaaatatttc atagattta tcaaacactg atagtttaaa   120
ctgaaggcgg gaaacgacaa tctgctagtg gatctcccag tcacgacgtt gtaaaacggg   180
cgccccgcgg aaagcttgcg                                                200

<210> SEQ ID NO 6
<211> LENGTH: 200
<212> TYPE: DNA
<213> ORGANISM: Artificial Sequence
<220> FEATURE:
<223> OTHER INFORMATION: DNA sequence of the 3' junction on chromosome
      B07

<400> SEQUENCE: 6
gcaagctagg agtaggatag agaccttaaa cgtcgttggt gtgaagagtc atcttcagac    60
ctaatggaga tagatgtaga cggcggcacg aagactctga caaaagacaa tcaaaaaata   120
tcaaaaagat taktgtcytg attagcyagy ttgagaagca actgttacta attcaacgta   180
gcacgacaac aaacagcttt                                                200
```

BRASSICA JUNCEA LINE NUBJ1207

RELATED APPLICATION

This Application is a National Phase entry of PCT/US2020/048038, filed Aug. 26, 2020, which claims priority benefit of U.S. Provisional Application No. 62/891,908 filed 26 Aug. 2019, which is fully incorporated herein by reference for all purposes.

SEQUENCE LISTING

This Application contains a Sequence Listing having a filed named 87376_0015US_ST25.txt, 3000 bytes in size and created Feb. 23, 2022, which has been submitted in ASCII format via EFS-Web and is filed concurrently herewith and fully incorporated herein by reference in its entirety.

FIELD

The present embodiments relate to a new and distinctive DPA-producing *Brassica juncea* line designated NUBJ1207.

BACKGROUND

Long-chain omega-3 polyunsaturated fatty acids ω3 LC PUFA) are well-recognized for their critical role in human diets. The ω3 LC PUFA Δ7, 10, 13, 14,17-docosapentaenoic acid (DPA) contributes to various aspects of human well-being, from heart and vascular health to brain development and lifelong brain function. There remains a need for a land-based source of DPA.

SUMMARY

The present embodiments provide a plant, derivative or progeny plant, plant part, or seed of DPA *Brassica juncea* line NUBJ1207 ("DPA *juncea*"), representative sample of seed of which was deposited under ATCC Accession No. PTA-125954 (see Appendix). One aspect of the embodiments provides a method for producing a DPA *juncea* seed comprising crossing two *Brassica* plants and harvesting the resultant seed, wherein at least one of the two *Brassica* plants is DPA *juncea* line NUBJ1207 or progeny thereof.

DETAILED DESCRIPTION

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

All patents and other publications identified are incorporated herein by reference for the purpose of describing and disclosing, for example, the methodologies described in such publications that might be used in connection with the present invention, but are not to provide definitions of terms inconsistent with those presented herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on information available to the applicants and do not constitute any admission as to the correctness of the dates or contents of these documents.

As used herein and in the claims, the singular forms "a," "an," and "the" include the plural reference unless the context clearly indicates otherwise. Throughout this specification, unless otherwise indicated, "comprise," "comprises," and "comprising" are used inclusively rather than exclusively, so that a stated integer or group of integers may include one or more other non-stated integers or groups of integers. The term "or" is inclusive unless modified, for example, by "either." Thus, unless context indicates otherwise, the word "or" means any one member of a particular list and also includes any combination of members of that list.

All values are approximate as there is some fluctuation in fatty acid composition due to environmental conditions. Values are typically expressed as area percent, which approximates percent by weight, of total fatty acid or percent weight of the total seed. Accordingly, other than in the operating examples, or where otherwise indicated, all numbers expressing quantities or reaction conditions used herein should be understood as modified in all instances by the term "about."

Unless defined otherwise, all technical and scientific terms used herein have the same meaning as those commonly understood to one of ordinary skill in the art. The terminology used herein is for the purpose of describing particular embodiments only, and is not intended to limit the scope of the present invention, which is defined solely by the claims. In order that the present disclosure can be more readily understood, certain terms are first defined. Additional definitions are set forth throughout the detailed description.

The present embodiments provide for *Brassica* lines that produces the LC ω3 PUFA DPA in its seed oil, specifically a line embodying the trait of *B. juncea* line NUBJ1207. LC ω3 PUFAs are known in the art, for a relevant discussion of these and other fatty acids, see e.g., U.S. Pat. No. 10,570,405.

*Brassica juncea* belongs to the Cruciferae (Brassicaceae) plant family, commonly known as the mustard family. Typically, *B. juncea* has pale green foliage, with a few hairs on the first leaves and leaf blades that terminate well up the petiole; plants reach from 1-2 meters in height; lower leaves are deeply lobed; upper leaves are narrow, entire, and free from clasping; flowers are pale yellow and open progressively upwards from the base of an elongated raceme; silique (seed pods) are slightly appressed, and 2.5 to 5 cm in length exclusive of a 0.5 to 1 cm-long beak; seeds are round and can be yellow or brown. *B. juncea* is an amphidiploid (AABB genome, 2n=36) of *B. rapa* (AA genome, 2n=20) by *B. nigra* (BB genome, 2n=16).

*Brassica juncea* ssp. *juncea* is cultivated mainly for its seed. More specifically, oilseed *B. juncea* is grown as a spice crop (mustard seed) in North America, but is also used as a source of cooking oil in Asia and elsewhere. Nearly all the oilseed *B. juncea* that is grown (mostly in the Indian subcontinent) is high in both erucic acid and glucosinolates, but some low-glucosinolate and low-erucic acid varieties provide canola-quality edible oil. More specifically, "canola oil" must contain less than 2% erucic acid; and canola meal is defined as one gram of air-dry, oil-free meal that must contain less than 30 μmoles of 3-butenyl glucosinolate, 4-pentenyl glucosinolate, 2-hydroxy-3 butenyl glucosinolate, 2-hydroxy-4-pentenyl glucosinolate, or a mixture thereof. See, e.g., CODEX ALIMENTARIUS: FATS, OILS & RELATED PRODUCTS, Vol. 8 (2nd ed., Food & Agriculture Org. United Nations, Rome, Italy, 2001). Notably, the seed oil of *B. juncea* line NUBJ1207 contains less than 1% erucic acid.

Compared with the more widely grown canola species *B. napus* and *B. rapa, B. juncea* is more tolerant to heat and drought stress. Generally, *B. juncea* may be either swathed or straight combined, because it is more shatter-resistant than some *B. napus*. Further information regarding *B. juncea* biology, crosses, and diseases is readily available. See, e.g., Canadian Food Inspection Agency, Biology Document BIO2007-01, *Biology of Brassica juncea (Canola/Mustard)* (2012). Neither wild-type *B. juncea, B. napus*, nor *B. rapa* produce DPA in seed oil.

A "line" is a group of plants that displays very little overall variation among individuals sharing that designation. "Line" also refers to a homogeneous assemblage of plants carrying substantially the same genetic material that display little or no genetic variation between individuals for at least one trait, in particular the transgenes present in line NUBJ1207 and the resultant production of DPA. "Variety" or "cultivar" may be used interchangeably with "line," but in general the former two terms refer to a line that is suitable for commercial production. "Genetically derived" as used for example in the phrase "genetically derived from the parent lines" means that the characteristic in question is dictated wholly or in part by an aspect of the genetic makeup of the plant in question.

"Progeny" means all descendants including offspring and derivatives of a plant or plants and includes the first, second, third, and subsequent generations; and may be produced by self-pollination of plants or by crossing with plants with the same or different genotypes, and may be modified by a range of suitable genetic engineering techniques. Cultigen generally relates to plants that have been deliberately altered and selected by human. "T0" refers to the first generation of transformed plant material, "T1" refers to the seed produced on T0 plants, T1 seed gives rise to T1 plants that produce T2 seed, etc., to subsequent Tx progeny.

"Plant part" includes plant cells, plant organs, plant protoplasts, plant cell tissue cultures from which plants can be regenerated, plant calli, plant clumps, and plant cells that are intact in plants or parts of plants such as embryos, pollen, ovules, seeds, pods, leaves, flowers, branches, fruit, stalks, roots, root tips, anthers, cotyledons, hypocotyls, radicles, single cells, gametes, cell cultures, tissue cultures, and the like. A cotyledon is a type of seed leaf; a small leaf contained on a plant embryo. A cotyledon contains the food storage tissues of the seed. The embryo is a small plant contained within a mature seed. "Plant cells" also encompass non-regenerable plant cells. Progeny, derivatives, variants, and mutants of regenerated plants are also included within the scope of the present embodiments, provided that these parts comprise one, two, or three of nucleic acid molecules as exemplified by SEQ ID NOs:1 and 2, SEQ ID NOs:3 and 4, and SEQ ID NOs:5 and 6, which molecules are characteristic of DPA *juncea* NUBJ1207. The present embodiments are also directed to the use of elite event NUBJ1207 transgenes in plant cell culture and tissue culture. The embodiments include plants and plant parts from the elite event NUBJ1207 line, as well as other plants produced by the described methods.

At least one embodiment described herein provides a new *B. juncea* line, designated NUBJ1207, that produces DPA in its seed oil. Other aspects of the present embodiments provide seed, plants, and plant parts of DPA *juncea* NUBJ1207; methods for producing a canola plant produced by crossing the DPA *juncea* NUBJ1207 with itself or another canola genotype; and the creation of variants by mutagenesis or transformation of DPA *juncea* NUBJ1207. Thus, the present embodiments include any such methods using the line NUBJ1207, including selfing, backcrossing, hybrid production, and crosses to populations. All plants produced using line NUBJ1207 as a parent are within the scope of the present embodiments. In at least one embodiment, DPA *juncea* line NUBJ1207 is used in crosses with other different canola plants to produce first generation ($F_1$) hybrid seeds and plants with superior characteristics. Accordingly, in addition to *B. juncea*, examples of members of the *Brassica* genus useful in practicing the present embodiments include but are not limited to *B. napus, B. napobrassica, B. oleracea, B. carinata, B. rapa*, and *B. campestris*, as well as any other plants belonging to the genus *Brassica* that permit breeding between *Brassica* species. Generally, "oilseed plant" refers to any one of the species *B. napus, B. rapa* (or *campestris*), or *B. juncea*.

Phenotypic characterizations of DPA *juncea* line NUBJ1207, in addition to production of DPA in seed oil, include:

TABLE 1

Description Information for DPA *Juncea* NUBJ1207*

| | |
|---|---|
| Species | *Brassica juncea* |
| Leaf: Shape | Oblong |
| Leaf: Number of lobes | Few |
| Leaf: Width of midrib | Narrow |
| Leaf: Length | Short to Medium |
| Time of Flowering | Medium to Late |
| Flower: Color of petals | Yellow |
| Plant: Mature Height | Tall |
| Silique: Length | Medium |
| Silique: Length of beak | Short to Medium |
| Seed Color | Brown |
| Seed: Yield | Medium |
| Seed: % Oil | Low to Moderate** |
| Seed: % Erucic Acid | 0.04% |
| Seed: % EPA C20:5n3 | 0.65% |
| Seed: % DPA C22:5n3 | 13.37% |
| Seed: % DHA C22:6n3 | (Trace) |

*Australian autumn-sown observations;
**Relative to non-DPA *Brassica*

The DPA *juncea* described herein may be an A line, a B line, or a R line. A line is a male sterile line; B is similar to "A" in all features, but it is a male fertile; R restores fertility in an F1 hybrid when crossed with a B line. Because a B line is used to maintain the fertility it may also be called a maintainer line. A restorer line is a pollinator variety used to pollinate a male sterile line to produce F1 progeny which are male fertile and thus produce seeds on selfing. An inbred line may permit restoration of fertility to the progeny of male sterile lines to which it is crossed. Thus, hybrid lines may be grown from F1 seed produced by crossing two inbred (pure) lines, one of which may be male sterile.

For pure line selection, the progeny of single plant selections (self-pollinated), are kept separate and not bulked together. The expected result is a set of genetically homogeneous lines. Accordingly, a pure line may be the progeny of a single self-fertilized homozygous plant.

Accordingly, the present embodiments provide a method of introducing a desired trait into DPA juncea line NUBJ1207, wherein the method comprises crossing a NUBJ1207 plant with a plant of another *Brassica* genotype that comprises a desired trait to produce progeny plants, wherein the desired trait is selected from the group consisting of male sterility, herbicide tolerance, insect resistance, modified fatty acid metabolism, modified carbohydrate metabolism, modified seed yield, modified oil percent, modified protein percent, modified lodging resistance, and resistance to bacterial disease, fungal disease, or viral disease; selecting one or more progeny plants that have the desired trait to produce selected progeny plants; crossing the selected progeny plants with the NUBJ1207 plants to produce backcross progeny plants; selecting for backcross progeny plants that have the desired trait and essentially all of the physiological and morphological characteristics of the NUBJ1207 line to produce selected backcross progeny plants; and repeating these steps three or more times to produce selected fourth or higher backcross progeny plants that comprise the desired trait and essentially all of the physiological and morphological characteristics of line NUBJ1207 as described herein. Included in this aspect of the embodiments is the plant produced by the method wherein the plant has the desired trait (i.e., DPA production) and essentially all of the physiological and morphological characteristics of line NUBJ1207.

"Breeding" includes all methods of developing or propagating plants and includes both intra- and inter-species and intra- and inter-line crosses as well as all suitable conventional breeding and artificial breeding techniques. Desired traits (e.g., the NUBJ1207 DPA trait) may be transferred to other canola or *B. juncea* lines, cultivars, or cultigens; or through conventional breeding methods and can also be transferred to other *Brassica* species, such as *B. napus* and *B. rapa* through inter-specific crossing. Both conventional breeding methods and inter-specific crossing methods, as well as other methods of transferring genetic material between plants, are well-known in the art.

*B. juncea* line NUBJ1207 was developed by *Agrobacterium tumefaciens*-mediated transformation with the genetic construct pJP3416_GA7-modB ("modB"), which includes seven genes capable of promoting the accumulation of omega-3 fatty acids in seed. Briefly, the modB construct contains genes encoding a Δ6-desaturase cloned from the microalga *Micromonas pusilla*, a Δ6-elongase and a Δ5-elongase cloned from the microalga *Pyramimonas cordata*, a Δ5-desaturase cloned from the microalga *Pavlova salina*, a Δ15/ω3-desaturase cloned from the yeast *Pichia pastoris*, a Δ12-desaturase cloned from the yeast *Lachancea kluyveri*, and a Δ4-desaturase cloned from *Pavlova salina*, each with suitable transcription promoters and terminators. See, e.g., U.S. Pat. No. 10,570,405 (FIG. 1), U.S. Pat. Nos. 10,563,218, 10,125,084, 9,718,759, and 9,932,541. Upon insertion into *B. juncea* (a low erucic acid, low glucosinolates line) from which NUBJ1207 was derived, however, the Δ4-desaturase gene of modB was truncated and rendered inoperable.

Genetic analysis revealed that NUBJ1207 contains three recombinant transgene loci, each with distinct transgene inserts comprising expression cassettes, each insert located in a different chromosome. Specifically, the transgene insert in NUBJ1207 chromosome A06 comprises a truncated MAR sequence (640 bp of Rb7 Matrix attachment regions of *Nicotiana tabacum*), the promoter of *Arabidopsis thaliana* FA elongase 1 (Pro_Arath-FAE1), the *P. cordata* Δ6-elongase gene, the terminator of *Glycine max* lectin (Ter_Glyma-Lectin), the promoter of cauliflower mosaic virus 35S RNA, the coding sequence of the phosphinothricin acetyltransferase (PAT) enzyme, the terminator from *A. tumefaciens* nopaline synthase (TER_Agrtu-NOS), and an *A. tumefaciens* left border sequence used for transfer of T-DNA (LB). The transgene insert in NUBJ1207 chromosome B07 includes an *A. tumefaciens* right border sequence used for transfer of T-DNA (RB), a terminator of *Linum usitatissimum* conlinin2 (TER_Linus-Cnl2), the *M. pusilla* Δ6-desaturase, and a truncated promoter of *L. usitatissimum* conlinin2 (PRO_Linus-Cnl2) (missing 5' 228 bp). The transgene insert in NUBJ1207 chromosome A08 comprises RB, TER_Linus-Cnl2, the *M. pusilla* Δ6-desaturase, PRO_Linus-Cnl2; Pro_Arath-FAE1, *P. cordata* Δ5-elongase, Ter_Glyma-Lectin; promoter of *B. napus* napin (PRO_Brana-Fp1), the *P. salina* Δ5-desaturase, TER_Agrtu-NOS; a terminator of *L. usitatissimum* conlinin1 (TER_Linus-Cnl1), the *P. pastoris* Δ15/ω3-desaturase, the promoter of *L. usitatissimum* conlinin1 (PRO_Linus-Cnl1); and PRO_Linus-Cnl2, then 21 base pairs of the *P. salina* Δ4-desaturase. (Note that the expression cassettes just described reflect vector design in which genes are not placed in the same 5'-to-3' orientation). Further regarding the transgene insert in A08, the truncated Δ4-desaturase sequence encodes only the first seven N-terminal amino acid residues of the enzyme and would not be expected to have Δ4-desaturase activity, consistent with the observed fatty acid content of line NUBJ1207 seed oil.

The three transgene insertions in line NUBJ1207 provide most of genes from the binary vector modB, except the Δ12-desaturase and Δ4-desaturase genes. *B. juncea* contains endogenous Δ12-desaturare and Δ15/ω3-desaturase genes, however, so that Δ12-desaturation activity is complemented by the endogenous gene. Additionally, line NUBJ1207 contains two copies of the Δ6-desaturase transgene. These transgene inserts provide the metabolic flux that converts oleic acid (OA) to DPA, but no further conversion of DPA to DHA due to the absence of Δ4-desaturase activity.

Accordingly, an embodiment provides a seed of *Brassica juncea* line designated NUBJ1207, a representative sample of seed of which was deposited under ATCC Accession No. PTA-125954, wherein said seed contains within its genome: a first transgenic locus located on a first chromosome comprising a *P. cordata* Δ6-elongase and a phosphinothricin acetyl-transferase; a second transgenic locus located on a second chromosome comprising a *M. pusilla* Δ6-desaturase; and a third transgenic locus located on a third chromosome comprising a *M. pusilla* Δ6-desaturase, a *P. cordata* Δ5-elongase, a *P. salina* Δ5-desaturase, a *Pichia pastoris* Δ15/ω3-desaturase, and a non-functional portion of a *P. salina* Δ4-desaturase.

From initial transformants, progeny were self-pollinated and the pedigree system of plant breeding then used to develop the present embodiment, line NUBJ1207. Some of the criteria used for selection in various generations include: DPA content (as a % of total fatty acids in the seed), vigor, fertility, standability, disease tolerance, oil content, maturity. NUBJ1207 is thus a transgenic *Brassica* that is genetically stable, uniform and no off-type plants have been exhibited in evaluation. The NUBJ1207 line has shown genetic stability and uniformity as described in the phenotypic description information. It has been self-pollinated a sufficient number of generations with careful attention to uniformity of plant type. The line has been increased with continued observation for uniformity.

The primary phenotypic characteristic of NUBJ1207 is the production of noticeable amounts of DPA in its seed oil. As shown herein, the bulk seed of NUBJ1207 typically contains about 10% DPA or more (as % of total fatty acids in seed).

At least one embodiment is directed to methods for producing a DPA *Brassica* plant by crossing a first parent plant with a second parent plant, wherein the first or second plant is the plant from the *Brassica juncea* line NUBJ1207. In at least one embodiment, both first and second parent plants may be from the line NUBJ1207. Any breeding methods using the line NUBJ1207 are envisioned: selfing, backcrosses, hybrid breeding, and crosses to populations. Any plants produced using *B. juncea* line NUBJ1207 as a parent are within the scope of the present embodiments. For example, *B. juncea* line NUBJ1207 may be crossed with a canola-quality low glucosinolates *B. juncea* line to provide a low glucosinolates DPA *B. juncea*.

Additional methods of the present embodiments include introduction of expression vectors introduced into plant tissues using a direct gene transfer method such as microprojectile-mediated delivery, DNA injection, electroporation or by using *Agrobacterium*-mediated transformation. In some embodiments, a transgenic variant of NUBJ1207 may contain at least one additional transgene (in addition to those present in NUBJ1207), such as 1, 2, 3, 4, 5, 6, 7, 8, 9, or 10 additional transgenes. Accordingly, the present invention also relates to super-transformed variants of the claimed line NUBJ1207, or variants obtained by breeding NUBJ1207 with one or more other transgenic *Brassica*. Such transgenes are expressed under control of regulatory sequences (e.g., promoters, enhancers, intervening sequences, terminators) well-known in the art. In one embodiment, the desired trait may be one or more of herbicide tolerance, insect resistance, disease resistance, modified seed yield, modified oil percent, modified protein percent, modified lodging resistance, or modified fatty acid or carbohydrate metabolism. The specific gene may be any gene known in the art or listed herein, including but not limited to a marker gene, a polynucleotide (nucleic acid molecule) conferring resistance or tolerance to imidazolinone, sulfonylurea, glyphosate, glufosinate, 2,4-D, Dicamba, L-phosphino-thricin, triazine, hydroxyphenylpyruvate dioxygenase inhibitor, protoporphyrinogen oxidase inhibitor, phenoxy proprionic acid, cyclohexone, or benzonitrile; a polynucleotide encoding a *Bacillus thuringiensis* polypeptide, a polynucleotide encoding phytase, a polynucleotide encoding a 1-acyl-glycerol-3-phosphate acyltransferase (LPAAT), a galactinol synthase, or a raffinose synthetic enzyme; or a polynucleotide conferring resistance to blackleg, white rust, or other common canola diseases. Such transgenes and related techniques are well-known in the art, see, e.g., U.S. Pat. Nos. 9,718,759, 8,143,488. Alternatively, the DPA trait of such transgenic embodiments may be obtained by breeding a canola comprising at least one transgene, as just described, with NUBJ1207. For example, DPA yield may be increased by introgressing NUBJ1207 with the transgenic *B. napus* A02 chromosome described in U.S. Pat. No. 10,563,218. The trait of producing DHA as well as DPA may be obtained by introgressing into NUBJ1207 at least one complete modB insert, such as, for example, the transgenic A05 chromosome described in U.S. Pat. No. 10,570,405 (one locus containing two modB constructs).

Accordingly, transgenes or other phenotypic traits can be introduced into NUBJ1207 or the DPA-producing trait of NUBJ1207 introduced into other *Brassica* or canola lines using traditional breeding techniques, such as introgression or backcrossing, well-known in the art. Canola plant breeding techniques that may be employed in generating progeny of NUBJ1207 include, for example, recurrent selection, bulk selection, mass selection, mutation breeding, backcrossing, pedigree breeding, tissue culture, open pollination breeding, restriction fragment length polymorphism enhanced selection, genetic marker enhanced selection, producing doubled haploids. Often combinations of these techniques are used. The development of *Brassica* varieties in a plant breeding program requires, in general, the development and evaluation of homozygous varieties. See, e.g., US 2018/0016591, U.S. Pat. No. 8,143,488; Downey et al., *Rapeseed & Mustard*, at 437 in PRINCIPLES OF CULTIVAR DEVEL. (Fehr (ed.), Macmillan & Co., NY, 1987); Thompson, *Breeding winter oilseed rape Brassica napus*, 7 Adv. Appl. Biol. 1-104 (1983); Ward et al., *Oilseed Rape* (Farming Press Ltd., Wharefedale Road, Ipswich, Suffolk, 1985).

In another aspect of the present embodiments, NUBJ1207 and its progeny can be identified not only by its phenotypic trait (i.e., production of DPA), but by identification of its genotype. As described in Example 3, herein, NUBJ1207 has a unique genetic profile not only provided by its transgenes, but comprising the unique DNA sequences at the junctions created upon the insertion of the transgenic cassettes into the *B. juncea* genome. More specifically, portions of the genetic construct GA7-modB are present at three loci, each locus on a different chromosome (chromosomes A08, A06, and B07), creating six unique junctions each with a unique DNA sequence.

The marker profile of NUBJ1207 can be recognized using techniques such as RFLP, Randomly Amplified Polymorphic DNAs (RAPDs), Arbitrarily Primed Polymerase Chain Reaction (AP-PCR), DNA Amplification Fingerprinting (DAF), Sequence Characterized Amplified Regions (SCARs), Amplified Fragment Length Polymorphisms (AFLPs), SSRs which are also referred to as Microsatellites, or SNPs. See, e.g., Glick, et al., METHODS IN PLANT MOLEC. BIOL. & BIOTECHNOL. (CRC Press, Boca Raton, 1993). An example assay for identification of NUBJ1207 junctions is the Kompetitive Allele Specific PCR (KASP) assay, the method of which is exemplified in US 2018/0016591.

Currently, canola is recognized as an increasingly important oilseed crop and a source of meal in many parts of the world. DPA *juncea* line NUBJ1207 or its progeny can be used in the production of oil, meal, or other food or feed products, including dietary supplements or pharmaceuticals, in accordance with known techniques. Advantageously, oil obtained from DPA *juncea* NUBJ1207 is low in erucic acid (less than 1%). Glucosinolates may be found in the meal fraction of processed seed, and can be minimized by methods known in the art.

In accordance with the Budapest Treaty, Applicants have deposited seed of DPA *B. juncea* NUBJ1207 with the American Type Culture Collection (ATCC®) located at 10801 University Blvd., Manassas, Va., 20110-2209 U.S.A., under Accession No. PTA-125954. Applicants have satisfied the requirements of 37 C.F.R. §§ 1.801-1.809. Applicants have no authority to waive any restrictions imposed by law on the transfer of biological material or its transportation in commerce. Applicants do not waive any rights granted under patent laws or plant breeders rights.

Accordingly, an aspect of the present embodiments provides a seed of *Brassica juncea* line designated NUBJ1207 (DPA *juncea* NUBJ1207), a representative sample of seed of which was deposited under ATCC Accession No. PTA-125954. At least one embodiment provides a *Brassica* plant, or part thereof, comprising the genome of the seed of DPA *juncea* NUBJ1207, produced by growing the seed of DPA *juncea* NUBJ1207, such as seed, pollen, cotyledon, half-cotyledon, tissue culture of regenerable cells, or ovule. A tissue culture or regenerable cells, according to one embodiment, regenerates plants capable of expressing all the morphological and physiological characteristics of the DPA *juncea* NUBJ1207, and may consist leaves, pollen, embryos, roots, root tips, pods, flowers, ovules, and stalks. Another embodiment provides a *Brassica* plant, or parts thereof, having all the physiological and morphological characteristics of DPA *juncea* NUBJ1207. Another embodiment provides cell of *B. juncea* line NUBJ1207, representative sample of seed of which was deposited under ATCC accession number PTA-125954.

Another aspect of the present embodiments provides a method of producing *Brassica* seed, comprising growing or cultivating DPA *juncea* NUBJ1207, a representative sample of seed of which was deposited under ATCC Accession No. PTA-125954, to produce seed, and harvesting the seed. This growing or cultivating can be done in a greenhouse, a tent, or in an open field. This growing or cultivating may be done on a commercial scale. At least one embodiment provides a composition comprising oil, meal, or meal protein obtained by practicing this method. The oil may be crude, refined, or enriched for one or more fatty acids.

Another aspect of the present embodiments provides a method of producing oil or meal, comprising obtaining seed of DPA *juncea* NUBJ1207 or related progeny thereof, and processing the seed to obtain oil or meal. At least one embodiment provides a composition comprising oil of the seed of DPA *juncea* NUBJ1207 or related progeny thereof. The oil may be crude, refined, or enriched for one or more fatty acids. At least one embodiment provides a composition comprising meal of the seed of DPA *juncea* NUBJ1207 or related progeny thereof.

Another aspect of the present embodiments provides a *Brassica* plant, or parts thereof, derived from DPA *juncea* NUBJ1207 (e.g., progeny) wherein the plant or parts thereof have been transformed so that its genetic material contains one or more transgenes, operably linked to one or more regulatory elements, in addition to the transgenes present in *Brassica juncea* line NUBJ1207. Accordingly, at least one embodiment provides a method for producing a *Brassica* plant that contains in its genetic material at least one transgene in addition to the transgenes of line NUBJ1207, comprising crossing a NUBJ1207 plant or a plant derived therefrom with a second plant of another *Brassica* line, so that the genetic material of the progeny that result from the cross expresses the additional at least one transgene. Alternatively, at least one embodiment provides a method for producing a *Brassica* plant that contains in its genetic material at least one transgene in addition to the transgenes of line NUBJ1207, comprises introducing into NUBJ1207 at least one an additional transgene. In such methods, the genetic material of progeny that result from the cross or transformation expresses the desired additional trait An additional transgene may confer herbicide resistance, insect resistance, bacterial disease resistance, fungal disease resistance, viral disease resistance, or sterility.

Another embodiment provides a method for producing a *Brassica* line NUBJ1207-derived canola plant comprising: (a) crossing *B. juncea* line NUBJ1207 with a second canola plant to yield progeny canola seed; and (b) growing said progeny canola seed, under plant growth conditions, to yield the *Brassica* line NUBJ1207-derived canola plant. This embodiment may further comprise: (c) crossing the NUBJ1207-derived canola plant with itself or another canola plant to yield additional NUBJ1207-derived canola progeny seed; (d) growing said progeny canola seed of step (c) under plant growth conditions, to yield additional NUBJ1207-derived canola plants; and (e) repeating the crossing and growing steps of (c) to (d) from zero (0) to ten (10) times to generate further NUBJ1207-derived canola plants, wherein the NUBJ1207-derived canola plants express least two NUBJ1207-traits selected from DPA production and at least one additional agronomically desirable trait. Related embodiments provide an NUBJ1207-derived canola plant, or parts thereof, produced by such methods.

Another embodiment provides a method for producing *Brassica* seed comprising crossing a first parent *Brassica* plant with a second parent *Brassica* plant and harvesting the resultant first-generation *Brassica* seed, wherein said first or second parent *Brassica* plant is a *Brassica* line NUBJ1207 plant. In particular, the first parent *Brassica* plant is different from the second parent *Brassica* plant, and the resultant seed is a first generation (F1) hybrid *Brassica* seed. Related embodiments provide further steps of backcrossing selected F1 hybrid plants with line NUBJ1207 or with or with the different *Brassica* plant having a desired trait, to produce backcross progeny seed; and growing the resulting backcross progeny seed and selecting backcross progeny plants that have the desired trait; and the repeating the backcrossing and growing steps on selected backcross progeny plants for one to ten generations to produce a progeny *Brassica* plant derived from *Brassica juncea* line NUBJ1207. In a related embodiment, the *Brassica juncea* line NUBJ1207-derived progeny can be obtained by self-pollinating (selfing) the F1 progeny.

Another embodiment provides a method for obtaining a *Brassica* inbred line comprising: (a) planting a collection of seed comprising seed of a hybrid, one of whose parent is the *Brassica* NUBJ1207, said collection also comprising seed of *Brassica* NUBJ1207; (b) growing canola plants from said collection of seeds; (c) identifying an inbred plant from said inbred line; (d) selecting said inbred plant; and (e) controlling pollination in a manner that preserves the homozygosity of said inbred plant. The seed of inbred *Brassica* line NUBJ1207 has been deposited under ATCC Accession No. PTA-125954. In some embodiments of this method, the *Brassica* inbred line may be *B. juncea* or *B. napus*.

At least one embodiment provides a method of producing a double haploid variety (a) isolating a flower bud of the F1 plant of as provided herein, (b) dissecting out a haploid microspore; (c) placing the haploid microspore in culture; (d) inducing the microspore to differentiate into an embryo and subsequently into a plantlet; (e) identifying whether the plantlet contains a diploid chromosome number, wherein the diploid chromosome number occurred through chromosome doubling; and continuing to grow the plantlet if it contains a diploid chromosome number.

A further aspect of the present embodiments provides novel nucleic acid molecules (e.g., DNA molecules) embodied by the junctions of the transgene inserts and the *B. juncea* genome, and cells or compositions comprising such nucleic acids. An example embodiment provides a DNA molecule comprising one, two, or three DNA molecules selected from (a) a DNA molecule comprising a sequence provided as SEQ ID NO:1 and a sequence provided as SEQ ID NO:2, (b) a DNA molecule comprising a sequence provided as SEQ ID NO:3 and a sequence provided as SEQ ID NO:4, or (c) a DNA molecule comprising a sequence provided as SEQ ID NO:5 and a sequence provided as SEQ ID NO:6. An example composition according to this aspect may be seedmeal comprising such DNA molecules. At least one embodiment provides plants (such as *Brassica* plants), seed, plant parts, seedmeal, etc., as described herein, comprising such DNA molecules.

A related embodiment provides a cell comprising one, two, or three nucleic acid molecules selected from (a) a DNA molecule comprising a sequence provided as SEQ ID NO:1 and a sequence provided as SEQ ID NO:2, (b) a DNA molecule comprising a sequence provided as SEQ ID NO:3 and a sequence provided as SEQ ID NO:4, (c) a DNA molecule comprising a sequence provided as SEQ ID NO:5 and a sequence provided as SEQ ID NO:6. The cell may be a *B. juncea* cell. The cell may be present in a plant, seed, or plant part as described herein. The cell may be present in meal (i.e., seedmeal).

Another aspect provides a method of using a DNA molecule of SEQ ID NO:1-NO:6, or a portion thereof. Such use, for example, includes identifying the presence of at least one of the loci characteristic of NUBJ1207. An embodiment provides methods of detecting the DNA molecules, such as amplification of a DNA molecule comprising a sequence of at least 20 consecutive nucleotides from one of SEQ ID NO:1-NO:6. In a particular embodiment, the method may be a KASP assay. A related embodiment provides a single stranded portion of any one of the nucleic acids of SEQ ID NO:1-NO:6, such as a primer or probe.

Another aspect of the present embodiments provides a method of detecting the presence of event NUBJ1207 in a sample comprising plant DNA, wherein the method comprises contacting said sample with at least one primer that binds to at least one transgene-flanking junction region of the *Brassica* genome as shown in SEQ ID NO:1 to SEQ ID NO:6. This method may employ a KASP™ genotyping assay. A related embodiment provides a plant, plant material, or plant-derived material identified by such methods. Another related embodiment comprises a kit comprising components to carry out such methods.

At least one embodiment provides a method of detecting the presence of event NUBJ1207 in a sample comprising plant DNA, wherein said method comprises: (a) contacting said sample with a first primer that binds to a flanking junction region of *Brassica* genome of NUBJ1207 and a second primer that binds to a transgene of NUBJ1207; (b) subjecting said sample to polymerase chain reaction; and (c) characterizing the amplicons generated between said primers.

Another aspect of the present embodiments provides genomic DNA of inbred *B. juncea* line NUBJ1207, representative seed of said inbred line having been deposited under ATCC Accession Number PTA-125954. A related embodiment provides a plant cell comprising (a) DNA having the sequence shown in at least one of SEQ ID NO:1 to SEQ ID NO:6, (b) DNA having at least 95% identity with at least one of SEQ ID NO:1 to SEQ ID NO:6, or (c) the complement of (a) or (b).

Another aspect of the present embodiments provides a seed of *B. juncea* line NUBJ1207 or a plant derived therefrom (i.e., progeny or related progeny), comprising about 5%, about 6%, about 7%, about 8%, about 9%, about 10%, about 11%, about 12%, about 13%, about 14%, about 15%, about 16%, about 17%, about 18%, about 19%, or about 20%, inclusive, DPA (as % of total fatty acid in seed oil). Another embodiments provides a collection of seed comprising at least 95% seed of *B. juncea* line NUBJ1207 or plants derived therefrom, wherein said seed comprises about 5%, about 6%, about 7%, about 8%, about 9%, about 10%, about 11%, about 12%, about 13%, about 14%, about 15%, about 16%, about 17%, about 18%, about 19%, or about 20%, inclusive, DPA (as % of total fatty acids in seed oil). A particular embodiment provides seed oil obtained from such seed or collection of seed.

A further aspect provides a method of obtaining DPA-containing *Brassica* grain comprising the steps of: (a) introgressing the DPA trait of NUBJ1207 into an elite *Brassica* line that is male sterile; (b) introgressing the DPA trait of NUBJ1207 into a second elite *Brassica* line that is fertile; (c) crossing the two lines (a) and (b) to obtain a hybrid progeny; (d) cultivating the seed of the hybrid progeny; and (e) harvesting the grain produced by the cultivated hybrid progeny.

EXAMPLES

Example 1. Cultivation Trial (North America)

Seed obtained from NUBJ1207 elite event-derived B line had the following fatty acid profile as determined by gas chromatography (Table 2):

TABLE 2

Fatty Acid profile of *B. juncea* B line NUBJ1207 (pooled seed)

| Fatty Acid | Percent (Area %)* |
|---|---|
| C16:0 | 3.8 |
| C18:0 | 2.5 |
| C18:1n9c (OA) | 40.1 |
| C18:1n7c | 2.8 |
| C18:2n6c (LA) | 7.4 |
| C18:3n3 (ALA) | 16.9 |
| C18:4n3 (SDA) | 1.1 |
| C20:1n9c | 1.3 |
| C20:4n3 (ETA) | 3.1 |
| C22:5n3 (DPA3) | 13.2 |

*Excludes less than 1.0 Area %.

The seed was planted in North America zone 7 in the spring. During cultivation, specific agronomic characteristics were monitored roughly weekly, as shown in the following Table 3:

TABLE 3

Emergence to Harvest of line NUBJ1207 in summer trial:

| Observation | Time (Days) |
|---|---|
| Emergence | 1 |
| v2-v4 | 9 |
| v4-v6 | 14 |
| Bolting/Beginning to flower | 35 |
| Blooming | 43 |
| End of bloom | 49 |
| Setting seed | 60 |
| Setting seed | 70 |
| Seed set | 79 |
| Harvest | 86 |
| DPA content (% total fatty acids) | 13.23% |

Example 2. Cultivation Trials (Australia)

Four lines of DPA-producing *B. juncea*, including NUBJ1207, were field-trialed in separate tents in Australia, and the fatty acid content of mature seed (bulk pooled) analyzed by gas chromatography (alternatively, seed fatty acid can be measured using high resolution NMR). Fatty acids content for fatty acids present at more than 1% (of % total fatty acid) are shown in the Table 4, below. Data shows consistency between bulk and single plant derived generations.

TABLE 4

Comparison of seed oil fatty acid content (more than 1%)

| line | Seed Moisture % wt | Seed Oil % wt | Palmitic (C16) | Steric (C18) | Oleic (C18:1) | Cis-vaccenic (C18:1n7c) | Linoleic (C18:2n6c) | ALA (C18:3n3) |
|---|---|---|---|---|---|---|---|---|
| 1 | 6.3 | 37.4 | 4.0 | 2.6 | 41.3 | 2.9 | 7.9 | 16.7 |
| 2 | 6.2 | 38.2 | 3.8 | 2.7 | 43.5 | 2.9 | 7.9 | 16.6 |
| 3 | 6.4 | 36.1 | 3.9 | 2.6 | 41.3 | 2.9 | 7.4 | 16.6 |
| NUBJ1207 | 6.5 | 36.1 | 3.8 | 2.6 | 40.6 | 2.9 | 7.4 | 17.3 |

| line | SDA (C18:4n3) | Gondoic (C20:1n9c) | ETA (C20:4n3) | DTA (C22:4n3) | DPA3 (C22:5n3) | Other | Sum EPA, DPA, DHA |
|---|---|---|---|---|---|---|---|
| 1 | 1.1 | 1.4 | 3.4 | 1.8 | 11.3 | 3.7 | 12.2 |
| 2 | 1.0 | 1.3 | 3.3 | 1.9 | 10.3 | 3.3 | 10.7 |
| 3 | 1.1 | 1.2 | 3.7 | 2.4 | 11.7 | 3.7 | 12.3 |
| NUBJ1207 | 1.1 | 1.3 | 3.8 | 2.1 | 12.1 | 3.6 | 12.7 |

DPA *juncea* NUBJ1207 was field-grown in southeastern Australia during the winter of 2017. Seeds were sown in May, resulting plants began flowering 139 days after sowing, and seed was harvested 218 days after sowing.

Single plant derived pool seed data from tent-grown NUBJ1207 siblings is shown in Table 5, below. Data shows consistency of between T5 generation sibs.

TABLE 5

Comparison of seed oil fatty acid content (more than 1%) NUBJ1207 siblings

| Plant | Palmitic (C16) | Steric (C18) | Oleic (C18:1) | Cis-vaccenic (C18:1n7c) | Linoleic (C18:2n6c) | ALA (C18:3n3) | SDA (C18:4n3) | Gondoic (C20:1n9c) | ETA (C20:4n3) | DPA3 (C22:5n3) | Other | Sum EPA, DPA, DHA |
|---|---|---|---|---|---|---|---|---|---|---|---|---|
| 1 | 3.57 | 2.34 | 41.40 | 2.77 | 7.05 | 17.75 | 1.05 | 1.31 | 3.53 | 11.77 | 5.87 | 12.36 |
| 2 | 3.65 | 2.49 | 40.74 | 2.77 | 6.41 | 17.23 | 1.05 | 1.28 | 3.56 | 12.74 | 6.28 | 13.42 |
| 3 | 3.57 | 2.29 | 41.17 | 2.75 | 6.88 | 17.47 | 1.00 | 1.26 | 3.40 | 12.55 | 5.95 | 13.23 |
| 4 | 3.68 | 2.40 | 41.17 | 2.66 | 7.55 | 18.68 | 0.91 | 1.22 | 3.54 | 10.87 | 5.76 | 11.42 |
| 5 | 3.78 | 2.10 | 36.46 | 2.97 | 6.23 | 16.13 | 1.14 | 1.25 | 3.71 | 17.35 | 7.03 | 18.13 |
| 6 | 3.68 | 2.37 | 37.72 | 2.81 | 7.37 | 17.81 | 1.15 | 1.26 | 3.62 | 14.23 | 6.23 | 14.94 |
| 7 | 3.78 | 2.68 | 38.77 | 3.05 | 7.11 | 17.36 | 1.12 | 1.23 | 3.58 | 13.37 | 6.13 | 14.03 |
| 8 | 3.57 | 2.28 | 41.26 | 2.72 | 7.23 | 17.61 | 1.02 | 1.29 | 3.56 | 12.05 | 5.84 | 12.65 |
| 9 | 3.69 | 2.54 | 38.84 | 2.73 | 6.59 | 18.02 | 1.05 | 1.27 | 3.57 | 13.61 | 6.24 | 14.32 |
| 10 | 3.54 | 2.45 | 42.30 | 2.65 | 7.50 | 17.75 | 0.95 | 1.31 | 3.47 | 10.87 | 5.65 | 11.43 |
| 11 | 3.58 | 2.46 | 39.92 | 2.78 | 7.23 | 17.61 | 1.10 | 1.28 | 3.41 | 13.04 | 5.87 | 13.70 |
| 12 | 3.50 | 2.35 | 42.88 | 2.76 | 7.02 | 16.95 | 0.86 | 1.32 | 3.30 | 11.42 | 6.11 | 11.94 |
| 13 | 3.58 | 2.45 | 40.50 | 2.93 | 6.72 | 17.34 | 1.04 | 1.27 | 3.61 | 12.73 | 6.07 | 13.42 |
| 14 | 4.04 | 2.55 | 36.38 | 2.98 | 7.31 | 18.35 | 1.16 | 1.18 | 3.45 | 14.11 | 6.51 | 14.86 |
| 15 | 3.63 | 2.16 | 39.05 | 2.60 | 6.76 | 18.42 | 1.10 | 1.27 | 3.75 | 13.55 | 6.01 | 14.26 |
| 16 | 3.91 | 2.39 | 40.70 | 2.87 | 7.82 | 17.53 | 1.16 | 1.22 | 3.12 | 11.24 | 5.60 | 12.64 |
| 17 | 3.57 | 2.50 | 40.45 | 2.72 | 7.09 | 17.84 | 1.02 | 1.25 | 3.62 | 12.21 | 6.01 | 12.84 |
| 18 | 3.68 | 2.34 | 40.98 | 2.68 | 6.56 | 17.22 | 1.00 | 1.28 | 3.66 | 12.60 | 6.22 | 13.29 |
| 19 | 3.73 | 2.41 | 39.38 | 2.88 | 7.30 | 17.24 | 1.06 | 1.25 | 3.55 | 13.26 | 6.24 | 13.88 |
| 20 | 3.83 | 2.54 | 39.71 | 2.87 | 7.69 | 17.54 | 1.13 | 1.24 | 3.32 | 12.56 | 5.85 | 13.16 |

In a further experiment, seed pods were harvested, at varying stages of maturity and plant position, from ten individual tent-grown plants and the seed analyzed. The data below, Table 6, shows consistency between pods varying in maturity and position on plant.

TABLE 6

Comparison of DPA *Juncea* NUBJ1207 seed pods

| Pod | Seeds/Pod | Palmitic (C16) | Steric (C18) | Oleic (C18:1) | Cis-vaccenic (C18:1n7c) | Linoleic (C18:2n6c) | ALA (C18:3n3) | SDA (C18:4n3) | Gondoic (C20:1n9c) | ETA (C20:4n3) | DPA3 (C22:5n3) | Other | Sum EPA, DPA, DHA |
|---|---|---|---|---|---|---|---|---|---|---|---|---|---|
| 1 | 9 | 3.46 | 2.56 | 43.09 | 2.56 | 7.79 | 16.90 | 0.82 | 1.37 | 3.62 | 10.48 | 5.83 | 11.01 |
| 2 | 14 | 4.08 | 2.45 | 37.31 | 2.60 | 7.48 | 18.01 | 1.33 | 1.23 | 4.03 | 14.04 | 5.67 | 14.69 |
| 3 | 11 | 3.43 | 2.42 | 42.09 | 2.64 | 7.88 | 16.72 | 0.85 | 1.37 | 3.80 | 11.55 | 5.74 | 12.07 |
| 4 | 8 | 3.80 | 2.51 | 40.16 | 2.77 | 7.29 | 17.20 | 1.03 | 1.30 | 4.02 | 12.05 | 6.17 | 12.62 |

TABLE 6-continued

Comparison of DPA *Juncea* NUBJ1207 seed pods

| Pod | Seeds/ Pod | Palmitic (C16) | Steric (C18) | Oleic (C18:1) | Cis-vaccenic (C18:1n7c) | Linoleic (C18:2n6c) | ALA (C18:3n3) | SDA (C18:4n3) | Gondoic (C20:1n9c) | ETA (C20:4n3) | DPA3 (C22:5n3) | Other | Sum EPA, DPA, DHA |
|---|---|---|---|---|---|---|---|---|---|---|---|---|---|
| 5 | 9 | 3.47 | 2.28 | 39.58 | 2.80 | 7.42 | 17.15 | 1.01 | 1.35 | 4.03 | 13.38 | 5.96 | 14.01 |
| 6 | 9 | 3.56 | 2.41 | 41.76 | 2.64 | 6.90 | 16.53 | 1.06 | 1.37 | 3.93 | 12.07 | 6.09 | 12.67 |
| 7 | 12 | 3.92 | 2.57 | 38.70 | 2.90 | 6.96 | 16.51 | 1.10 | 1.24 | 3.88 | 14.15 | 6.25 | 14.80 |
| 8 | 10 | 4.08 | 2.22 | 30.21 | 3.51 | 7.35 | 20.55 | 1.16 | 1.17 | 3.91 | 17.35 | 6.49 | 18.21 |
| 9 | 5 | 3.70 | 1.98 | 32.44 | 2.96 | 7.47 | 19.43 | 0.97 | 1.25 | 4.00 | 17.44 | 6.65 | 18.20 |
| 10 | 13 | 3.70 | 2.68 | 39.57 | 3.06 | 6.54 | 16.22 | 0.95 | 1.27 | 3.82 | 14.05 | 6.23 | 14.75 |

Example 4. Unique Flanking Regions

Methods and kits herein are useful for identifying in biological samples the presence of plant material comprising specifically the transgenes in NUBJ1207, as well as transgenic *Brassica* plants, plant materials, and seeds containing such event. The elite event NUBJ1207 described herein can be identified by genotype, which can be characterized through a genetic marker profile that can identify plants of the same cultivar or a related cultivar or be used to determine or validate a pedigree. Genetic marker profiles can be obtained by techniques such as Restriction Fragment Length Polymorphisms (RFLP), Randomly Amplified Polymorphic DNAs (RAPD), Arbitrarily Primed Polymerase Chain Reaction (AP-PCR), DNA Amplification Fingerprinting (DAF), Sequence Characterized Amplified Regions (SCAR), Amplified Fragment Length Polymorphisms (AFLP), Simple Sequence Repeats (SSR) (also referred to as Microsatellites), and Single Nucleotide Polymorphisms (SNP).

For example, the elite event NUBJ1207 described herein can be identified by generation of a genetic map from a sample of plant material. A genetic map can be generated by conventional RFLP, Polymerase Chain Reaction (PCR) analysis, or SSR which identifies the approximate chromosomal location of the integrated DNA molecule coding for the foreign protein. See Glick & Thompson, METHODS IN PLANT MOLEC. BIOL. & BIOTECHNOL. 269 (CRC Press, Boca Raton, FL, 1993). Map information concerning chromosomal location is useful for proprietary protection of a subject transgenic plant. For example, the map of the integration region can be compared to similar maps for suspect plants to determine if the latter have a common parentage with the subject plant. Map comparisons can involve hybridizations, RFLP, PCR, SSR and sequencing, all of which are conventional techniques DPA *juncea* NUBJ1207 is an inbred line from an elite event that can be characterized and identified by unique DNA sequences at the junctions of the parent plant genome and the inserted transgenic constructs. More specifically, each of chromosomes A08, A06, and B07 contain a 5' and 3' junction that is unique to DPA *juncea*.

For example, the DNA sequence of the 5' junction on chromosome A08 includes 100 nucleotides of *B. juncea* (italicized) and 100 nucleotides of the transgene (not italicized):

(SEQ ID NO: 1)
5'-*TAATCAGAGAAAGCTTGATGTCCACACTCWTG*

*AGCGAGRRSCCAGATTCCGGTTCCGAAAAGTCCTT*

*GAACGTARGGTRTAARGRYYYAGAAAGTGAACTTC*

*AAACACTGATAGTTTAAACTGAAGGCGGGAAACGA*

*CAATCTGCTAGTGGATCTCCCAGTCACGACGTTGT*

*AAAACGGGCGCCCCGCGGAAAGCTTGCG*-3'

For example, the DNA sequence of the 3' junction on chromosome A08 includes 100 nucleotides of the transgene (not italicized) and 100 nucleotides of *B. juncea* (italicized):

(SEQ ID NO: 2)
5'-AAGATACCCACTTTTACAACAATTACCAACAA

CAACAAACAACAAACAACATTACAATTACATTTAC

AATTACCATACCATGCCACCTAGCGCTGCTAAGAC

*TGATGGAAGATCTTCTCCTAGATCTCCACTTGCAG*

*ATCTAAATCTTCTGCTGAGGCTCTTGATGCTTTAA*

*GGATGCTTCTACTGCTCTGTTGATGCTT*-3'

For example, the DNA sequence of the 5' junction on chromosome A06 includes 100 nucleotides of *B. juncea* (italicized) and 100 nucleotides of the transgene (not italicized):

(SEQ ID NO: 3)
5'-*TGCTCGGTGTTACTAGAAGACCTCTGTTCWTA*

*GGATCAGATCCAGTAACGGTAACAGCGCTCATGGT*

*ATGGTAATTGTAAATGTAATTGTAATGTTGTTTGT*

TTGTAAAAAAAATTAATTTTTACTAACACATATAT

TTACTTATCAAAAATTTGACAAAGTAAGATTAAAA

TAATATTCATCTAACAAAAAAAAAACCA-3'

For example, the DNA sequence of the 3' junction on chromosome A06 includes 100 nucleotides of the transgene (not italicized) and 100 nucleotides of *B. juncea* (italicized):

(SEQ ID NO: 4)
5'-CGCGCGGTGTCATCTATGTTACTAGATCACTA

GTGATGTACGGTTAAAACCACCCCAGTACATTAAA

AACGTCCGCAATGTGTTATTAAGTTGTCTAAGCTT

*CCAACGACAATYMMGTGGATAGCAAAACCAATGAT*

```
AACAAACRGCAGTRRCAACGAACMYRAGAGGCCAG

TTGTGGGAATCAACTTCTACCTCAAGTG-3'
```

For example, the DNA sequence of the 5' junction on chromosome B07 includes 100 nucleotides of *B. juncea* (italicized) and 100 nucleotides of the transgene (not italicized):

```
                                            (SEQ ID NO: 5)
5'-TTGGTCAACATCCACCAACAACTATTCTTTTT

GGACAATTTTATAGAAAACACTCAATATGTGATTG

ATATATAATTTAAAAAATATTTCATAGATTTTATC

AAACACTGATAGTTTAAACTGAAGGCGGGAAACGA

CAATCTGCTAGTGGATCTCCCAGTCACGACGTTGT

AAAACGGGCGCCCCGCGGAAAGCTTGCG-3'
```

For example, the DNA sequence of the 3' junction on chromosome B07 includes 100 nucleotides of the transgene (not italicized) and 100 nucleotides of *B. juncea* (italicized):

```
                                            (SEQ ID NO: 6)
5'-GCAAGCTAGGAGTAGGATAGAGACCTTAAACG

TCGTTGGTGTGAAGAGTCATCTTCAGACCTAATGG

AGATAGATGTAGACGGCGGCACGAAGACTCTGACA

AAAGACAATCAAAAAATATCAAAAAGATTAKTGTC

YTGATTAGCYAGYTTGAGAAGCAACTGTTACTAAT

TCAACGTAGCACGACAACAAACAGCTTT-3'
```

For identification of DPA *juncea* NUBJ1207, primers to identify the junctions can be any suitable length derived from a larger junction sequence. The length of the junction sequences used to identify DPA *juncea* NUBJ1207 may be any suitable length that provides identification of a unique junction, for example at least 10, or at least 15, or 20 contiguous nucleotides from a junction of a transgene and the *B. juncea* DNA.

Although the preceding embodiments have been described in some detail by way of illustration and example for purposes of clarity and understanding, it will be clear to one of skill in the art that certain changes and modifications, such as single gene modifications and mutations, somaclonal variants, variant individuals selected from large populations of the plants of the instant inbred line, and the like, may be practiced within the scope of the invention which is limited solely by the appended claims.

We claim:

1. A seed of inbred *Brassica juncea* line designated NUBJ1207, or progeny thereof, a representative sample of seed of NUBJ1207 having been deposited under ATCC Accession No. PTA-125954, wherein said seed of NUBJ1207 or progeny thereof comprises within its genome three transgenic insertions defined by junction sequences SEQ ID NO:1, NO:2, NO:3, NO:4, NO:5, and NO:6; and wherein the seed oil of said seed of NUBJ1207 or progeny thereof comprises ω3 docosapentaenoic acid (DPA).

2. A *Brassica* plant, or a part thereof, comprising the genome of the seed of claim 1 and produced by growing the seed of claim 1.

3. The *Brassica* plant, or a part thereof of claim 2, wherein said part is at least one of seed, leaf, pollen, embryo, root, root tip, pod, flower, ovule, stalk, cell, protoplast or tissue culture.

4. A method of producing oil, comprising obtaining seed of the plant of claim 2 and processing the seed to obtain oil, and wherein said oil comprises DPA.

5. A *Brassica* plant, or a part thereof, of claim 2, wherein the genome of said plant or plant part further comprises one or more transgenes that confer a trait selected from at least one of herbicide resistance, insect resistance, bacterial disease resistance, fungal disease resistance, viral disease resistance, and sterility.

6. A method for producing a *Brassica* line NUBJ1207-derived canola plant comprising:
(a) crossing a plant of *Brassica juncea* line NUBJ1207, representative seed of said *B. juncea* line NUBJ1207 having been deposited under ATCC Accession No. PTA-125954, with a second canola plant to yield progeny canola seed; and
(b) growing said progeny canola seed, under plant growth conditions, to yield said *Brassica* line NUBJ1207-derived canola plant;
wherein the genome of said NUBJ1207-derived canola plant comprises three transgenic insertions defined by junction sequences of SEQ ID NO:1, NO:2, NO:3, NO:4, NO:5 and NO:6, and wherein the seed of said NUBJ1207-derived canola plant comprises ω3 docosapentaenoic acid.

7. The method of claim 6, further comprising:
(c) crossing said NUBJ1207-derived canola plant with itself or another canola plant to yield additional NUBJ1207-derived progeny canola seed;
(d) growing said progeny canola seed of step (a) under plant growth conditions, to yield additional NUBJ1207-derived canola plants; and
(e) repeating the crossing and growing steps of (a) and (b) from zero (0) to seven (7) times to generate further NUBJ1207-derived canola plants, wherein said NUBJ1207-derived canola plants express at least one additional agronomically desirable trait selected from at least one of herbicide resistance, insect resistance, bacterial disease resistance, fungal disease resistance, viral disease resistance, and sterility.

8. A method for obtaining a canola inbred line comprising:
(a) planting a collection of seed comprising seed of a hybrid, one of whose parent is the *Brassica* plant according to claim 2, said collection also comprising seed of said inbred line;
(b) growing canola plants from said collection of seeds;
(c) identifying an inbred plant from said inbred line;
(d) selecting said inbred plant; and
(e) controlling pollination in a manner which preserves the homozygosity of said inbred plant.

9. The method according to claim 8, wherein said one parent has all the physiological and morphological characteristics of inbred *Brassica* line NUBJ1207, seed of said line having been deposited under ATCC Accession No. PTA-125954.

10. The method of claim 8, wherein the canola inbred line is *B. juncea* or *B. napus*.

11. A method of detecting the presence of event NUBJ1207 in a sample comprising plant DNA, wherein said method comprises contacting said sample with at least one primer that binds to at least one transgene-flanking junction region of the *Brassica* genome as shown in SEQ ID NO:1 to SEQ ID NO:6.

12. The method of claim 11, wherein said method is a KASP™ genotyping assay.

13. The method of claim 11, wherein said method comprises (a) contacting said sample with a first primer that binds to a flanking junction region of *Brassica* genome of NUBJ1207 of claim 11 and a second primer that binds to a transgene of NUBJ1207; (b) subjecting said sample to polymerase chain reaction; and (c) characterizing the amplicons generated between said primers.

14. A seed of the *Brassica* plant of claim 2, comprising about 5%, about 6%, about 7%, about 8%, about 9%, about 10%, about 11%, about 12%, about 13%, about 14%, about 15%, about 16%, about 17%, about 18%, about 19%, or about 20%, inclusive, @3 docosapentaenoic acid (DPA) as a percentage of total fatty acid in seed oil, wherein percentage is area percent.

15. A collection of seed comprising at least 95% seed of the *Brassica* plant of claim 2, wherein said seed comprises about 5%, about 6%, about 7%, about 8%, about 9%, about 10%, about 11%, about 12%, about 13%, about 14%, about 15%, about 16%, about 17%, about 18%, about 19%, or about 20%, inclusive, DPA as a percentage of total fatty acid in seed oil, wherein the percentage is area percent.

16. A method of obtaining *Brassica* grain containing ω3 docosapentaenoic acid (DPA) comprising the steps of:
(a) introgressing the DPA trait of *B. juncea* line NUBJ1207 into an elite *Brassica* line that is male sterile;
(b) introgressing the DPA trait of line NUBJ1207 into a second elite *Brassica* line that is fertile;
(c) crossing the two lines (a) and (b) to obtain a hybrid progeny comprising the DPA trait;
(d) cultivating the seed of the hybrid progeny;
(e) harvesting the grain produced by the cultivated hybrid progeny,
wherein representative seed of *B. juncea* line NUBJ1207 has been deposited under ATCC Accession No. PTA-125954, and wherein the DPA trait of NUBJ1207 is characterized by three transgenic insertions defined by junction sequences of SEQ ID NO:1, NO:2, NO:3, NO:4, NO:5 and NO:6 and the production of DPA.

17. A seed oil extracted from the *Brassica* plant of claim 2, comprising fatty acids in an esterified form, the fatty acids comprising palmitic acid (C16), stearic acid (C18), oleic acid (C18:1), cis-vaccenic acid (C18:1n7c), linoleic acid (C18:2n6c), α-linolenic acid (C18:3n3), stearidonic acid (C18:4n3), gondoic acid (C20:1n9c), eicosatetraenoic acid (C20:4n3), ω3 docosatrienoic acid (C22:4n3), and ω3 docosapentaenoic acid (C22:5n3),
wherein in the total fatty acid content of said seed oil:
the level of palmitic acid is less than 5%, the level of steric acid is less than 4%,
the level of oleic acid is 35%-48%, the level of cis-vaccenic acid is less than 4%, the level of linoleic acid is less than 9%, the level of α-linolenic acid is 15%-20%,
the level of stearidonic acid is less than 2%, the level of gondoic acid is less than 2%,
the level of eicosatetraenoic acid is less than 4.5%, the level of ω3 docosatrienoic acid is 1%-3%, and the level of ω3 docosapentaenoic acid is 8%-15%,
wherein % is area percent of total fatty acid content.

* * * * *